United States Patent [19]
Turner

[11] Patent Number: 5,982,649
[45] Date of Patent: Nov. 9, 1999

[54] POWER SUPPLY CIRCUIT FOR A CONTROL CIRCUIT

[75] Inventor: Michael James Turner, Leeds, United Kingdom

[73] Assignee: Switched Reluctance Drives Limited, Harrogate, United Kingdom

[21] Appl. No.: 09/021,344

[22] Filed: Feb. 10, 1998

[30] Foreign Application Priority Data

Feb. 14, 1997 [GB] United Kingdom .................. 9703088

[51] Int. Cl.$^6$ ............................. H02M 5/42; H02M 7/06
[52] U.S. Cl. ............................................ 363/89; 363/126
[58] Field of Search ............................. 363/89, 124, 125, 363/126, 52, 53

[56] References Cited

U.S. PATENT DOCUMENTS

| | | | |
|---|---|---|---|
| 4,074,344 | 2/1978 | Pitel | 363/44 |
| 5,012,161 | 4/1991 | Borowiec et al. | 363/89 |
| 5,627,708 | 5/1997 | Lee | 361/56 |
| 5,838,181 | 11/1998 | Hesterman | 327/175 |

OTHER PUBLICATIONS

Linear Technology Corporation, "Power Factor Controller: LT1248," Jun. 1993, pp. 1–12.

Unitrode Integrated Circuits, "Enhanced High Power Factor Preregulator: UC1854A/B, UC2854A/B, UC3854A/B," May 1993, pp. 5–226 to 5–228.

Unitrode Integrated Circuits, "High Power Factor Preregulator: UC1854, UC2854, UC3854," Feb. 1993, pp. 5–218 to 5–225.

Unitrode Integrated Circuits, "High Power–Factor Preregulator: UC1852, UC2852, UC3852," Dec. 1992, pp. 5–213 to 5–217.

*Primary Examiner*—Matthew Nguyen
*Attorney, Agent, or Firm*—Arnold, White & Durkee

[57] ABSTRACT

A power supply circuit is provided for generating a low voltage for powering a control circuit. The power supply circuit is connected to a voltage source having a high voltage relative to the output voltage of the power supply circuit. The power supply circuit includes a power supply capacitor and a charging capacitor connected to the power supply capacitor which charges the power supply capacitor when the power supply circuit is connected to the high voltage source. The power supply also includes an inductor connected to the power supply capacitor which charges the power supply capacitor by resonant action when the power supply circuit is disconnected from the voltage source, so that the power supply capacitor is continuously charged. A pair of diodes are also provided. The first diode is connected between the charging capacitor and the power supply capacitor. The second diode is connected in series with the inductor. The power supply circuit further includes a zener diode connected to the power supply capacitor for regulating the voltage across the power supply capacitor.

33 Claims, 8 Drawing Sheets

POWER SUPPLY CIRCUIT FOR A CONTROL CIRCUIT

This application claims priority of the Great Britain patent application 9703088.6 filed on Feb. 14, 1997, entitled "Power Supply Circuit for a Control Circuit."

FIELD OF THE INVENTION

This invention relates generally to low voltage DC power supplies and more particularly to low voltage DC power supplies for control circuits.

BACKGROUND OF THE INVENTION

In general, the "power factor" of an electrical load refers to the ratio of the active power provided to the load to the apparent power applied to the load. The power factor is closely tied to the phase relationship between the electrical current drawn by the load and the electrical voltage applied to the load from a source of electrical power. If the drawn current is sinusoidal and completely in-phase with an applied sinusoidal voltage, then a unity power factor (i.e., a power factor of 1) is obtained.

High power factors are desirable for various reasons, including energy efficiency. The higher the power factor of a load, the lower the current demanded of the power supply utility for a given output power. Further, electronic loads with rectifier inputs and capacitive filtering frequently draw severely non-sinusoidal currents which results in poor power factor and can lead to distortion of the supply voltage. The higher the power factor, the lower the current that will be drawn from the supply for a given output power and the less the load will tend to distort the voltage waveform provided by the source of electrical power. To minimise supply currents and to avoid significant distortion of the voltage waveforms provided by power utilities, certain countries have promulgated regulations requiring electrical devices above a certain power rating to have a minimum power factor and limiting the harmonic content of the supply current.

In practice, electrical circuits often do not have unity power factors. In certain applications, such as motor control circuits that utilize a converter or inverter operating from a DC bus, the power factor can vary significantly from unity. Such circuits typically use a full wave bridge rectifier in combination with a relatively large DC bus capacitor to convert sinusoidal alternating input voltage into substantially constant direct voltage. In such arrangements, the rectifier output current should ideally follow the rectifier output voltage exactly. This is generally illustrated in FIG. 1 which illustrates an ideal load in which the current drawn by the circuit (indicated by the dashed line) is substantially in-phase with the applied voltage (indicated by the solid line).

Power factor correction (PFC) circuits are often used to improve the power factor of a load by modifying the current drawn by the rectifier such that it approaches that shown in FIG. 1. There are several commercially available PFC circuits. For example, Unitrode offers a family of high power-factor pre-regulator controllers under the model numbers UC1852, UC2852 and UC3852 and Linear Technology offers a power factor controller model number LT1248. These PFC devices are normally fabricated in analog integrated circuit chips and operate as analog circuits. In general, these devices use pulse width modulated switching to improve the power factors of circuits, such as convertors for switched reluctance motors, that utilize DC bus voltages derived from an alternating input.

FIG. 2 illustrates the use of an exemplary analog PFC chip 14. The circuit receives applied sinusoidal alternating voltage at the inputs of a full wave rectifier 4 and produces a full wave rectified sinusoidal voltage. The full wave rectified sinusoidal voltage is applied to one terminal of a filtering inductor 8. Coupled to the other terminal of the inductor 8 is a switching device 10, such as a power MOSFET or an IGBT. The other terminal of the switching device 10 is coupled to the negative rail of the DC bus. A PFC chip 14 provides switching signals to switch the switching device 10 on and off. The PFC chip receives as inputs (a) a measure of the full-wave rectified sinusoidal voltage at the output of the bridge rectifier 4 ($V_{SIN}$), (b) a measure of the voltage across the DC bus ($V_{RET}$) and (c) a measure or estimate of the current flowing in inductor 8, commonly obtained using a resistive shunt to measure current in the switching device 10. A DC bus capacitor 6 is coupled across the positive and negative rails of the DC bus. A diode 12 is provided to prevent current from flowing back from the load when the switch 10 is closed. In operation, the PFC chip opens and closes switching device 10 so that the load across the full wave rectifier 4 varies from the inductor 8 (when switch 10 is closed) to the inductor and the DC bus capacitor 6 (when switch 10 is opened). By properly switching switch 10 the current in inductor 8 is made to follow a waveform corresponding to the voltage variations at the output of full wave rectifier 4. The power factor of the system is thus improved. The operation of PFC chips is generally understood and is not addressed herein in detail.

The magnitude of the alternating voltage applied to the input of the full wave rectifier 4 is typically fairly high (as much as 240 volts r.m.s.), as is the magnitude of the DC bus voltage that appears across capacitor 6 (as much as 400V d.c.). Most PFC control circuits, however, additionally require a DC supply voltage that is substantially less than the DC voltage that appears across the DC bus typically 10 to 20 volts. Accordingly, some mechanism must be provided for providing a relatively low DC supply voltage 14 to the PFC chip. Moreover, the low DC supply voltage provided to the PFC controller must be referenced to the negative rail of the DC link.

Many approaches have been used to supply the relatively low DC voltage to the PFC control circuit. FIG. 3 illustrates one such approach. In FIG. 3 the low DC supply voltage for the PFC controller is provided by a capacitor 20 that is charged through a high power bleed resistor 16. A zener diode 18 controls the voltage across capacitor 20. One significant disadvantage of DC voltage supplies that employ bleed resistors is that a large voltage is dropped across the bleed resistor, whilst the current flowing through the bleed resistor must be at least equal to the current required by the PFC controller. This current produces considerable heat and represents a source of lost energy. This lost energy introduces inefficiencies into the system. A further disadvantage of DC voltage supplies using bleed resistors is that the bleed resistor must have characteristics capable of handling not only significant power dissipation but also the high voltage output of the full wave rectifier 4. Such resistors are often physically large, relatively expensive, and tend to increase the physical size and cost of systems using them.

Another common DC voltage supply for a PFC control circuit is illustrated in FIG. 4. In this circuit a second inductor 26 is inductively coupled to the filter inductor 8. The second inductor 26 is coupled to a storage capacitor 24 via a diode 30. During operation, PFC controller 14 will switch switching device 10 on and off at a fairly high frequency. The high frequency voltage components appearing across the inductor 8 as a result of this switching induce a current flow and voltage in inductor 26 through transformer action. This current flows through diode 30 and charges capacitor 24 to the desired DC voltage. A bleed resistor 22 is provided to charge capacitor 24 when the circuit is first energized, before the transformer action is sufficient to charge capacitor 24. As before, a zener diode 18 serves to regulate the voltage applied to the control circuit.

While a bleed resistor is still required, it can be of a much higher resistance than that of FIG. 3. The PFC control circuit will generally draw only a very small supply current until the capacitor 24 has charged to sufficient voltage to allow satisfactory operation of the PFC circuit. This allows resistor 22 to be of high resistance and hence the current flowing through it, and the power dissipated by it, will be relatively small. When the voltage across capacitor 24 has reached the required threshold, the PFC controller 14 will come into operation, drawing significant supply current. This current is initially supplied by capacitor 24 but is quickly supplied by the transformer action between inductors 8 and 26.

While the transformer-action DC voltage supply of FIG. 4 reduces the need for a large bleed resistor, it does not eliminate the need for such a resistor. Accordingly, the DC voltage supply of FIG. 4 suffers from the same disadvantages associated with the bleed resistor supply of FIG. 3, although not to the same extent. The additional winding 26 significantly increases the size and cost of the inductor 8 with which it must be combined. Moreover, the transformer action circuit of FIG. 4 is limited in that it is often insufficient to maintain an adequate voltage across capacitor 24. In these circumstances, it is necessary to reduce the value of resistance of the bleed resistor 22 to supplement the current from the inductor 26, bringing back the disadvantages already discussed.

In an effort to overcome the disadvantages associated with the circuits of FIGS. 3 and 4, approaches using more complex diode, capacitor and inductor arrangements have been proposed. FIG. 5 illustrates one such approach.

In FIG. 5 a circuit is provided in which capacitors 34 and 46 are arranged with diodes 32 and 36 to form a charge pump circuit. The charge pump circuit charges capacitor 46 which provides a DC voltage to the PFC chip 14.

As with the circuit of FIG. 4, the circuit of FIG. 5 includes a small bleed resistor 44 that is used to charge the capacitor 46 when the circuit is first energized. Zener diode 40 again serves to regulate the supply voltage to the PFC circuit. Once the PFC chip 14 is operational, the charge on capacitor 46 is maintained through the switching action of the PFC chip as follows. At an initial point in time, switching device 10 will be closed and the voltage at node A will be approximately the value of the negative rail of the DC bus (e.g, 0 volts). At this point, the voltage at node B will also be approximately 0 volts. At a later point in time, the operation of the PFC chip will have necessitated opening of switch 10. This will cause the voltage at node A to rise to approximately the value of the positive rail of the DC bus (e.g., 380 volts). The voltage across capacitor 34 cannot instantaneously change, and a charging current will flow through it as the voltage at node A rises. This charging current will bias diode 36 ON, and current will flow through capacitor 34, through diode 36 into capacitor 46, charging capacitor 46 to the desired low DC voltage level. Eventually, node A will reach the DC bus voltage approximately (e.g., 380 V), and the charging current flowing through capacitor 34 will cease. At this time, node B will be at approximately the same potential as the low voltage supply to the PFC chip and determined by zener diode 40. This might typically be 20 V, so that capacitor 34 is charged to a voltage of e.g., 360 V. In summary, at the time the switching device 10 is opened, capacitor 34 acts as a current source providing charge to the power supply capacitor 46.

At a later point in time, the PFC chip will close switching device 10 and the voltage at node A will again drop to approximately 0 volts. This switching event will also effectively place capacitor 34 in parallel with diode 32. This will discharge capacitor 34 through switching device 10 and diode 32. As the above indicates, in the circuit of FIG. 5 capacitor 34 approximates to a current source where the current is that charging capacitor 46 immediately after switching device 10 is opened, and where the capacitor discharges through switching device 10 immediately after switching device 10 is closed.

The DC voltage supply of FIG. 5 is limited in several respects. Initially it must be noted that all of the charge used to charge the power supply capacitor 46 is provided from capacitor 34. Accordingly, to prevent undesirable variations in the low voltage power supply, capacitor 34 must be sized sufficiently large so that power supply capacitor 46 is always adequately charged. This requirement of a sufficiently large capacitor 34 is disadvantageous in at least two respects. First, the capacitor 34 must be capable of withstanding high voltages. The larger the capacitor 34, the greater the cost and size of the capacitor and, hence, the larger the cost of the system. Second, as discussed above, while the charging current of capacitor 34 is used to charge the power supply capacitor 46 when the switching device is open, the charge across the capacitor 34 is discharged through switching device 10 when the switching device 10 is closed. Accordingly, switching device 10 must be sized to handle not only a portion of the current flowing through the full wave bridge 4, but must also dissipate all the energy stored in capacitor 34 at each instant of switch closure. This generally increases both the cost and the size of switching device 10. Further, the additional power dissipation in switching device 10 due to capacitor 34 results in a loss of power and increases the system inefficiencies. A further disadvantage of the power supply of FIG. 5 is that the power supply capacitor 46 is charged only when the switching device 10 is switched off. A still further disadvantage of the power supply of FIG. 5 is that, while it may be sufficient to drive the PFC controller 14, it typically cannot be used to drive other circuits, e.g., a motor control circuit or a system control circuit. Such a multi-purpose power supply would require significantly more output current than the circuit of FIG. 5. While one could theoretically increase the size of capacitors 34 and 46, such increases would necessitate a corresponding increase in the power handling capability of switching device 10, increase the cost of the system, and decrease the efficiency of the system.

As the foregoing demonstrates, known power supplies for PFC controllers generally result in the use of relatively expensive components or produce significant inefficiencies in the system. Moreover, such power supplies typically can power only PFC controllers and cannot power other circuits. It is an object of the present invention to overcome these and other problems in the prior art.

The present invention is defined in the accompanying independent claim. Some preferred features are recited in the dependent claims.

SUMMARY OF THE INVENTION

In accordance with one form of the present invention, a power supply circuit for a control circuit is provided. The power supply circuit generates a low voltage that powers the control circuit from a switched load connected to a high voltage DC bus. The power supply circuit includes a power supply capacitor having a first terminal and a second terminal for storing a low voltage used in powering the control circuit. The power supply circuit further includes a charging capacitor having a first terminal and a second terminal. The charging capacitor charges the power supply capacitor when the power supply circuit is connected to the DC bus. The first terminal of the charging capacitor receives an input voltage from the high voltage DC bus. The power supply circuit further includes a first rectifier having a anode and an cathode. The anode of the first rectifier is connected to the second terminal of the charging capacitor and the cathode of the first rectifier is connected to the first terminal of the power supply capacitor. The power supply circuit further includes an inductor having a first terminal and a second terminal. The first terminal is connected to the second terminal of the first capacitor and the anode of the first rectifier. The inductor charges the power supply capacitor by inductive action when the power supply circuit is disconnected from the DC bus. Thus, the power supply capacitor is charged both when the power supply circuit is connected to the DC bus and when it is not.

The power supply circuit further may include a second rectifier having an anode and a cathode. The anode of the second capacitor is connected to the second terminal of the power supply capacitor and the cathode of the second rectifier is connected to the second terminal of the inductor. The power supply circuit may further include a third rectifier having an anode and a cathode. The anode of the third rectifier is connected to the second terminal of the power supply capacitor and the anode of the second rectifier and the cathode of the third rectifier is connected to the cathode of the first rectifier and the first plate of the power supply capacitor.

In one embodiment of the present invention, the first and second rectifiers are standard diodes and the third rectifier is a zener diode. In another embodiment of the present invention, the first and third rectifiers are standard diodes and the second rectifier is a zener diode.

In accordance with another aspect of the present invention, a switched reluctance motor system is provided. The system includes a motor, a DC bus having a high output voltage, and a converter circuit having at least one switching device for controlling the application of power from the DC bus to the motor. The system further includes a switching device for connecting the DC bus to an alternating voltage source. An electronic controller is also provided for controlling the switching devices in the converter circuit. The system further includes a power factor correction circuit for increasing the power factor of the system. The power factor correction circuit controls the switching device for connecting the DC bus to the alternating voltage source. In this aspect of the present invention, the power factor correction circuit and the electronic controller are powered by a power supply circuit of the type described above.

BRIEF DESCRIPTION OF THE DRAWINGS

Other aspects and advantages of the present invention will become apparent upon reading the following detailed description and upon reference to the drawings in which.

Similar reference characters indicate similar parts throughout the several views of the drawings.

DETAILED DESCRIPTION OF THE INVENTION

Figure 1:
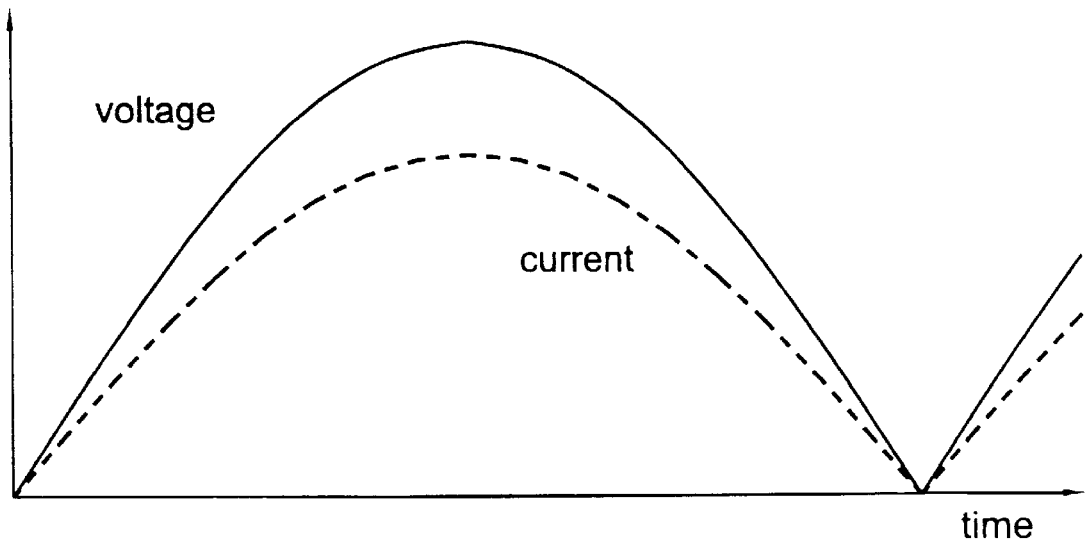
FIG. 1 is a graph of the output current of an ideal rectifier circuit which is indicated by the dashed line and is shown substantially in-phase with the output voltage (indicated by the solid line)
Figure 2:
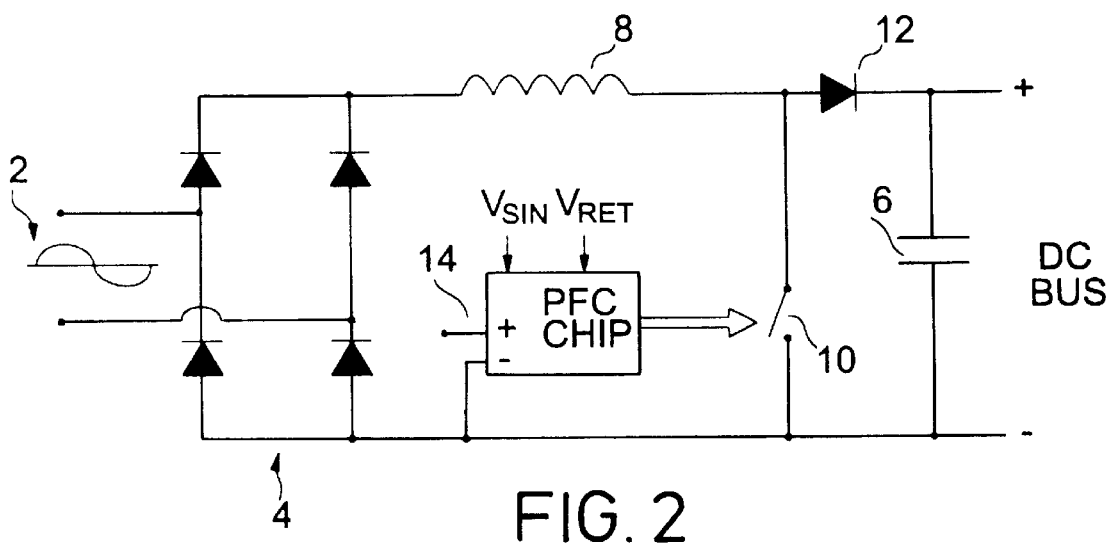
FIG. 2 is a schematic diagram of a circuit using an analog PFC chip.
Figure 3:
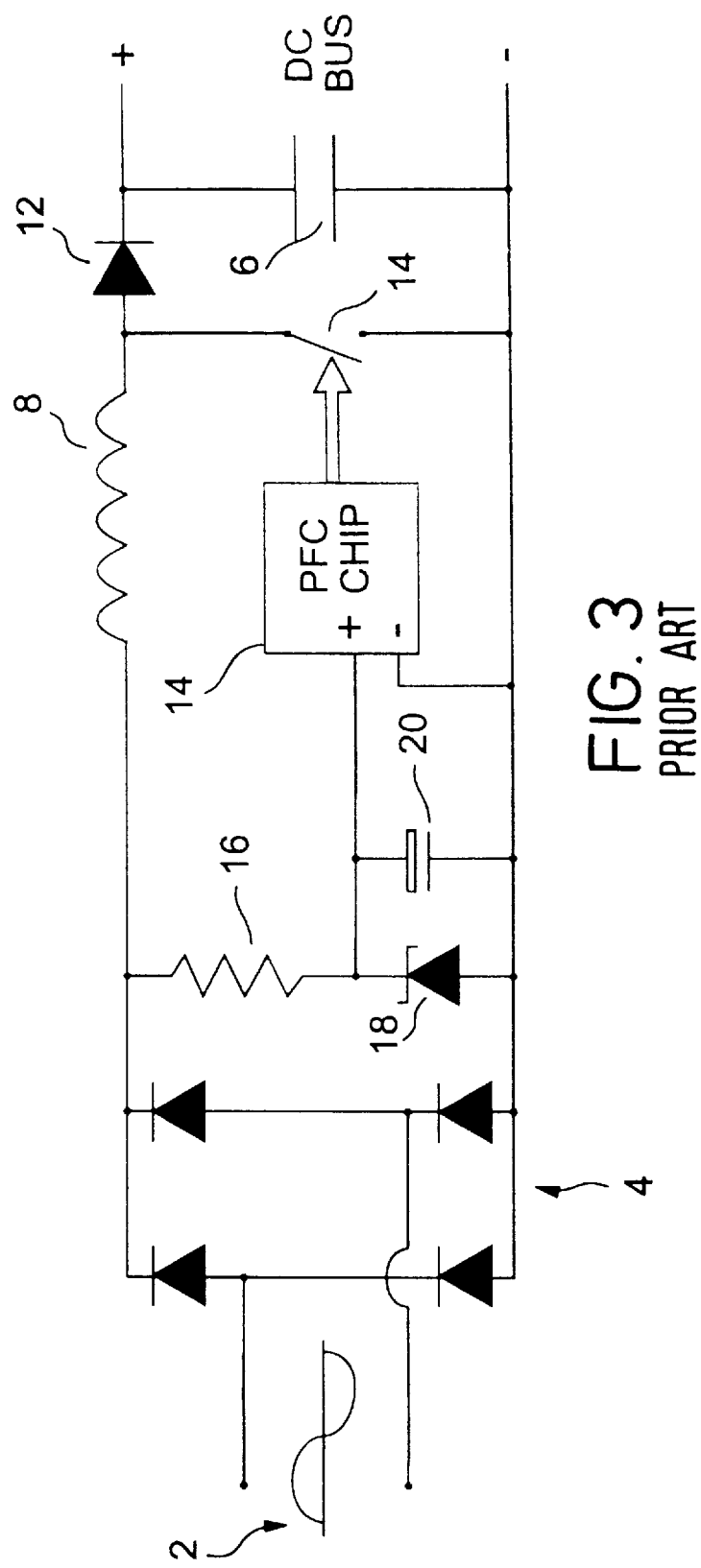
FIG. 3 is a schematic diagram of a prior art power supply circuit for a PFC chip.
Figure 4:
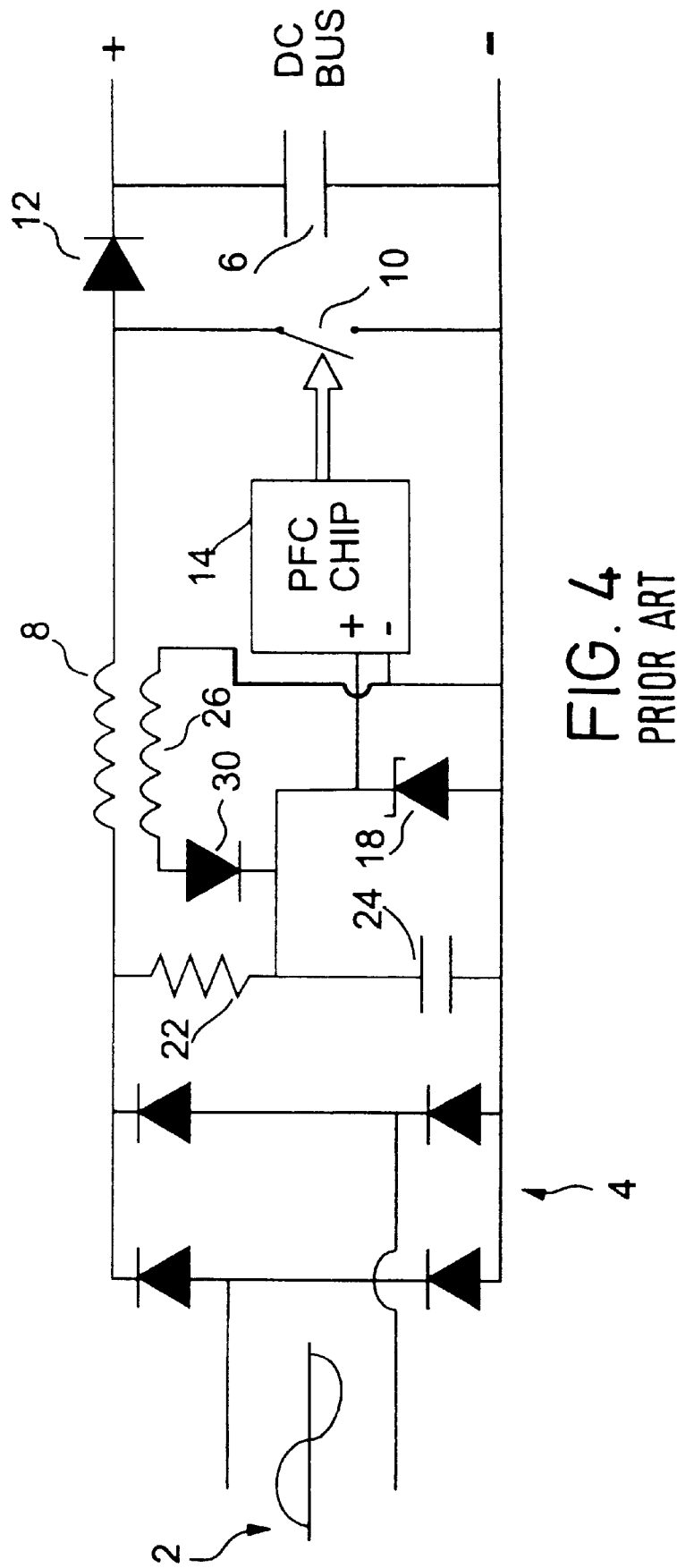
FIG. 4 is a schematic diagram of another prior art power supply circuit for a PFC chip.
Figure 5:
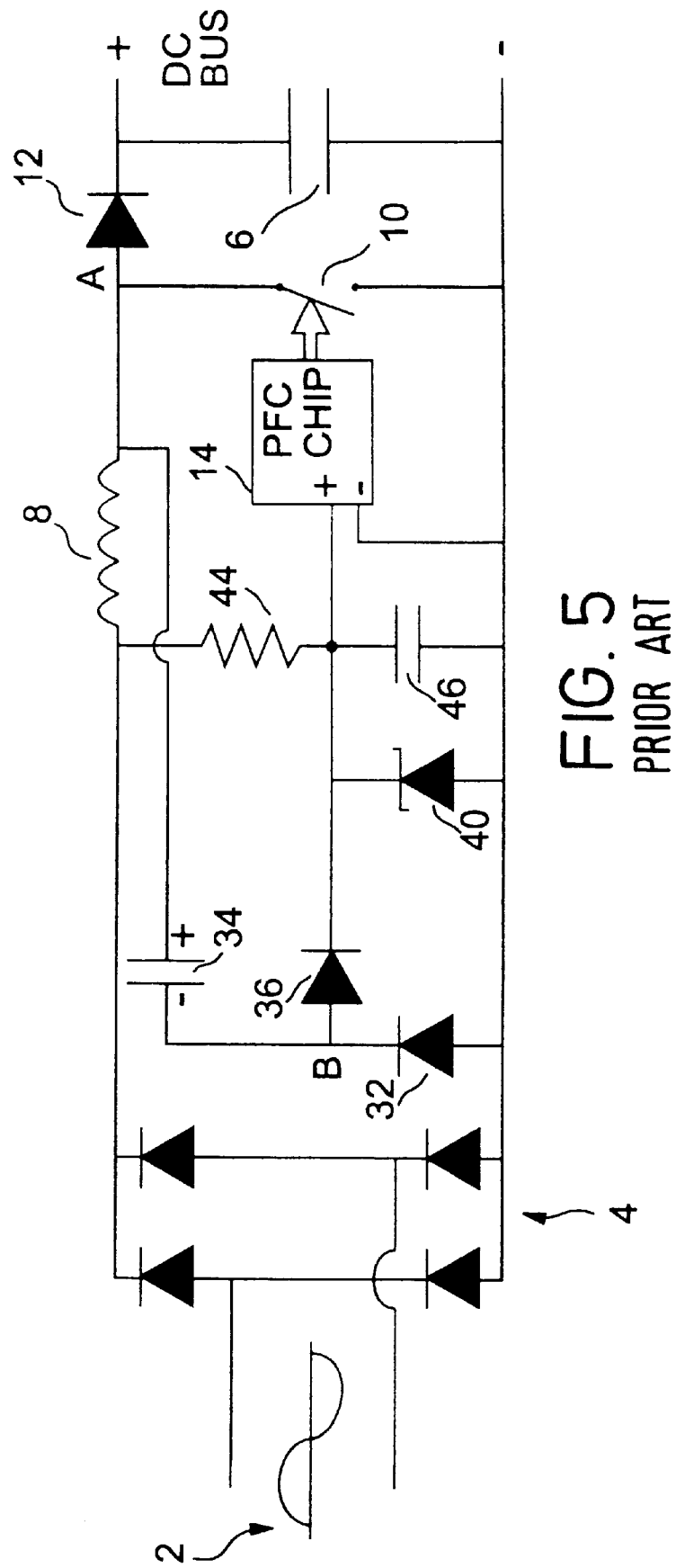
FIG. 5 is a schematic diagram of yet another prior art power supply for a PFC chip.
Figure 6:
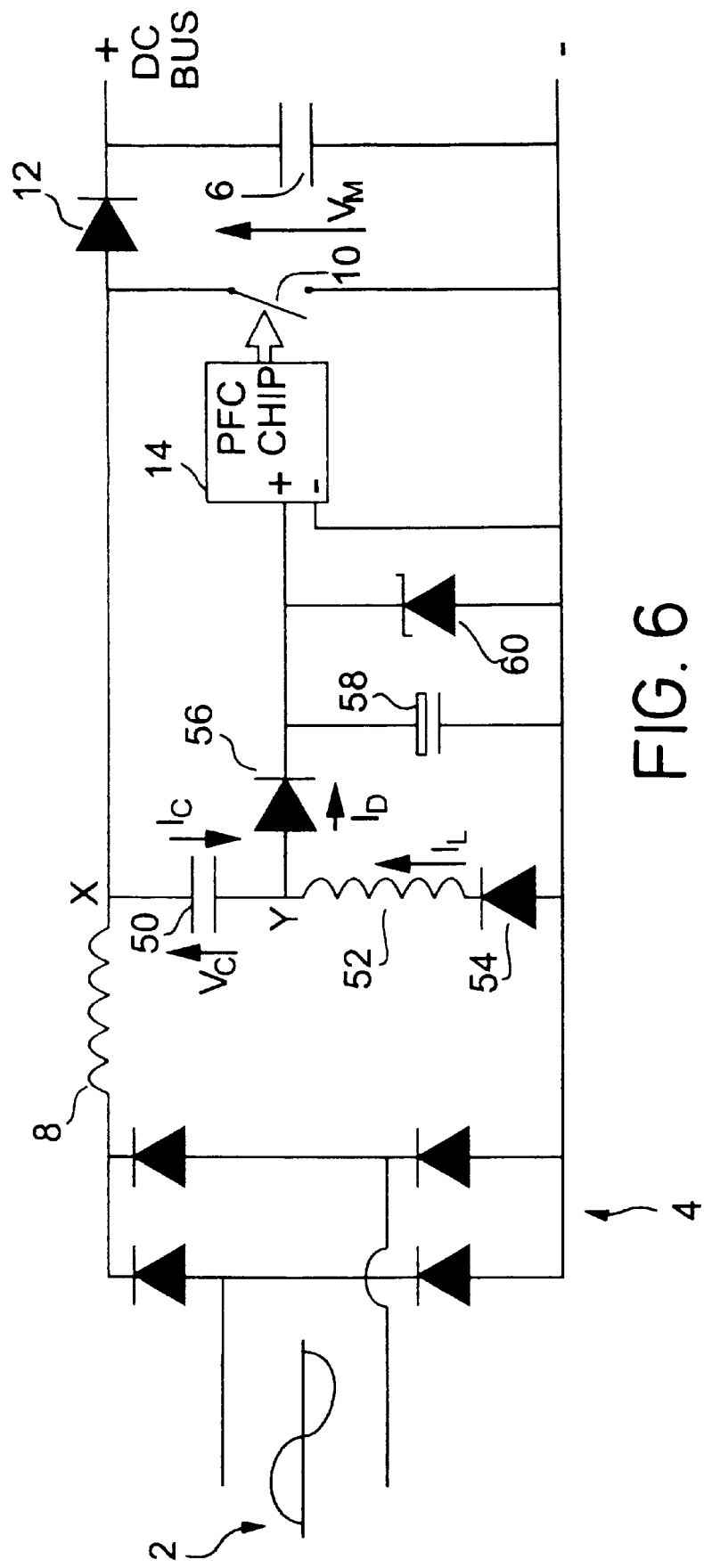
FIG. 6 is a schematic diagram of a power supply circuit for a control circuit according to the present invention.

Turning now to FIG. 6, a relatively low DC voltage power supply for circuits such as PFC circuits is illustrated. Although the following example addresses the use of the low voltage power supply in connection with a power supply for a PFC chip, the illustrated power supply can be used to generate a relatively low DC supply voltage from a switched load connected to a relatively high DC power supply. In the power supply of FIG. 6, the current provided to charge the power supply capacitor 58 is provided from two sources. A small percentage of the current that is used to charge the power supply capacitor 58 is provided from a relatively small capacitor 50 when the switching device is opened. A significantly greater percentage of the current used to charge the power supply capacitor 58 is provided via resonant action between inductor 52 and capacitor 50 when the switching device is closed. Because the great percentage of the current used to charge the power supply capacitor is provided by resonant action, capacitor 50 may be relatively small.

Referring to FIG. 6, the low voltage power supply comprises a power supply capacitor 58 across which is coupled a zener diode 60. Zener diode 60 serves to regulate the voltage across the capacitor 58 and, accordingly, serves to regulate the voltage level of the low voltage power supply. Although the desirable breakdown voltage of zener diode 60 will vary from application to application, in the example of FIG. 6, the breakdown voltage is assumed to be approximately 20 volts.

The power supply capacitor 58 is coupled to an inductor 52 via a diode 56. The inductor 52 is coupled to the negative rail of the DC bus 6 via a diode 54. The inductor 52 is also coupled to a relatively small capacitor 50.

In FIG. 6, the diode 54 is illustrated as a standard diode. In alternative embodiments, standard diode 54 may be replaced with a zener diode where the breakdown voltage of the zener diode is selected to be the desired low DC supply voltage. In such embodiments, zener diode 60 may be eliminated or replaced with a standard diode.

In operation, the circuitry of FIG. 6 provides current to the power supply capacitor 58 such that capacitor 58 remains charged to the desired low DC supply voltage. Moreover, the circuitry of FIG. 6 ensures that the amount of charge provided to power supply capacitor 58 is sufficient for the power supply as a whole to meet the output current requirements.

Unlike known systems, the circuitry of FIG. 6 provides current to charge power supply capacitor 58 both when the switching device 10 is opened and when the switching device 10 is closed. Moreover, unlike known systems, the majority of the current used to charge power supply capacitor 58 is provided when the switching device 10 is closed.

The operation of the circuitry of FIG. 6 may be best understood through consideration of FIG. 6 in conjunction with the voltage and current waveforms of FIGS. 7A–7E. FIGS. 7A–7E generally illustrate various currents and voltages in the circuitry of FIG. 6 over time.

Figure 7A:
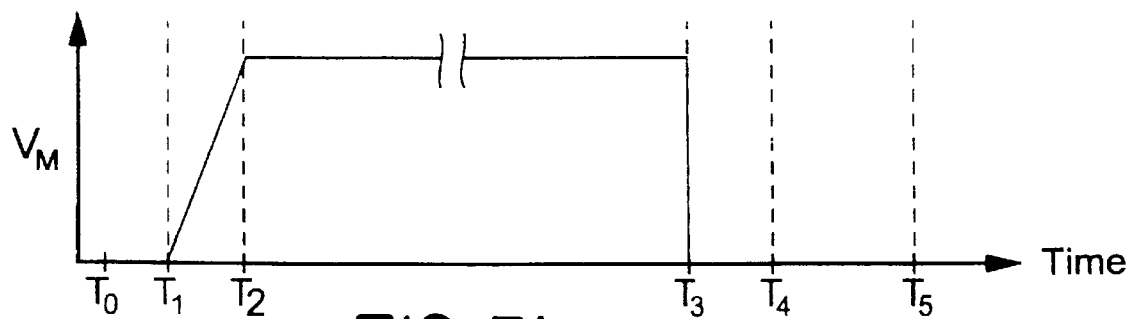
FIG. 7A is a graph of the voltage at node X of the circuit shown in FIG. 6 at various points in the operation of the circuit.

Referring to FIGS. 6 and 7A–7E, there is an initial point in time $T_0$ when switching device 10 is closed and the voltages represented in FIGS. 7A–7E are substantially constant. At that time, because switching device 10 is closed, the voltage across switching device 10 ($V_M$) will be substantially zero as illustrated in FIG. 7A. The voltage at node X in FIG. 6 will also be substantially zero at $T_0$. For reasons discussed more fully below, the voltage across capacitor 50 at time $T_0$ will be approximately the negative of the voltage provided by the low voltage DC power supply. Accordingly, the voltage at node Y will be approximately equal to the voltage provided by the low voltage DC power supply. As FIGS. 7C and D illustrate, at time $T_0$ there is no current flowing from capacitor 50 (i.e., $I_C$ is 0 amps), there is no current flowing through inductor 52 (i.e., $I_L$ is 0 amps) and there is no current flowing into the power supply capacitor 58 (i.e., ID is 0 amps).

At a point in time $T_1$ it is assumed that the switching device 10 is opened by, for example, a switching command from PFC chip 14. When switching device 10 is opened, the substantially constant current flowing in inductor 8 is directed to capacitor 50, and consequently, the voltage at node X (with reference to the negative rail of the DC bus) rises until it reaches $V_M$. At this time, diode 12 becomes forward-biased and the current from inductor 8 flows into the DC bus capacitor 6 which, in the example of FIG. 6, is charged to approximately 385 volts. This is illustrated in FIG. 7A.

Figure 7B:
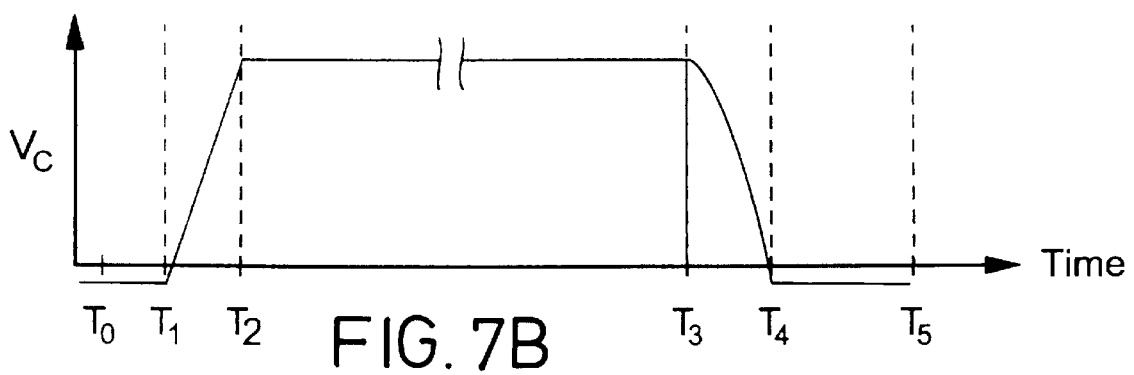
FIG. 7B is a graph of the voltage across the capacitor 50 in the circuit shown in FIG. 6 at various points in the operation of the circuit.

The charging current flowing through capacitor 50, as the voltage at node X rapidly rises from approximately 0 volts to approximately 385 volts, is forced to flow through diode 56 and, therefore, also into the network comprising capacitor 58 and zener diode 60. The capacitor 58 is thereby kept charged to the breakdown voltage of the zener diode 60, as desired. The voltage at node Y will correspondingly rise to a voltage of approximately 20 volts above the DC bus negative rail, while the voltage across the capacitor 50 rises in a linear fashion due to approximately constant current flowing into it from inductor 8. In this manner, the voltage across capacitor 50 rises from approximately −20 volts to approximately 365 volts. This is generally illustrated in FIG. 7B where the voltage across capacitor 50 ($V_C$) is illustrated and in FIG. 7E where the current $I_D$ is shown.

At a time $T_2$ after switching device 10 is opened, the voltage across capacitor 50 will have risen to the level of approximately 365 volts and the voltage at node X will have correspondingly risen to approximately 385 volts. At this point, the current flowing into capacitor 50 ($I_C$) and the current flowing into the power supply capacitor 58 ($I_D$) will return to zero. In the circuitry of FIG. 6, the relative sizing of capacitor 50 is such that the time interval between time $T_1$ and $T_2$ is relatively brief. For example, if it is assumed that at the time switching device 10 is opened the current flowing through switching device 10 was approximately 9.6 amps, the rate of change of the voltage across capacitor 50 will be approximately (9.6 A/179 pico-farads) or 53.6 kV/micro-second. Accordingly, it would take approximately (365V/(53.6 kV/micro-second)) or 6.8 nanoseconds for the voltage across capacitor 50 to reach 365 volts. Thus, the time interval between $T_1$ and $T_2$ is approximately 6.8 nanoseconds.

The voltage and current levels that exist in the circuit of FIG. 6 will remain constant for a relatively long time interval during which switching device 10 remains open. At a later point in time $T_3$ switching device 10 will be closed again, e.g., in response to a command from PFC chip 14.

Figure 7C:
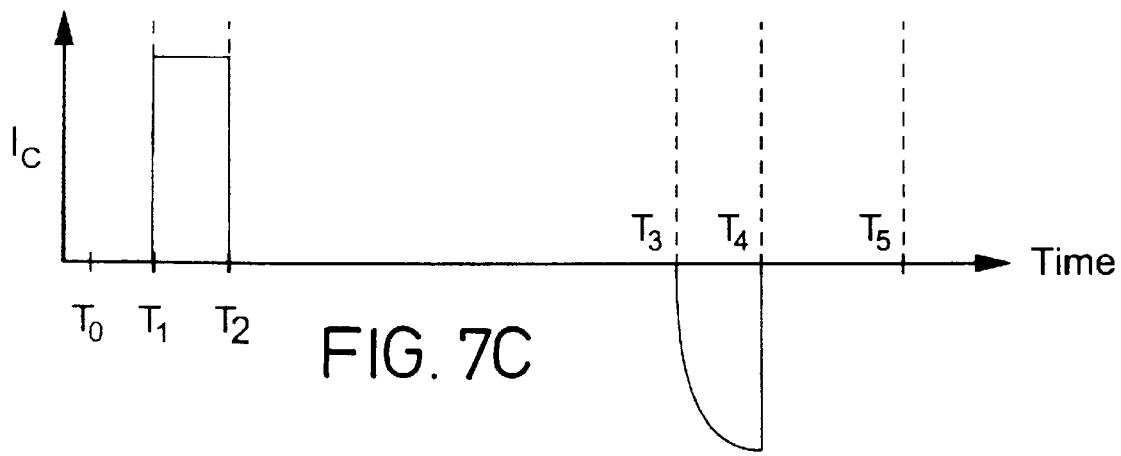
FIG. 7C is a graph of the current flowing through the capacitor 50 in the circuit shown in FIG. 6 at various points in the operation of the circuit.

At the time $T_3$ when switching device 10 is closed, the voltage across the switching device 10 ($V_M$), and the voltage at node X, will begin to rapidly drop from its initial value of 385 volts towards a value of approximately zero volts. As discussed above, the voltage across a capacitor cannot instantaneously change. Accordingly, as the voltage at node X drops from a value of near 385 volts towards zero volts, the voltage at node Y will change from a voltage of approximately 20 volts to a voltage of approximately −365 volts. At this time, because the voltage at node Y is less than the voltage on the negative rail of the DC bus, diode 54 will be biased on and a current IL will begin to flow from the negative rail of the DC bus through diode 54 and into inductor 52 and returning to the negative rail of the DC bus through capacitor 50 and switching device 10. This is illustrated in FIG. 7C. Note that, between $T_3$ and $T_4$, the current in capacitor 50 is the negative of the inductor current $I_L$.

Figure 7D:
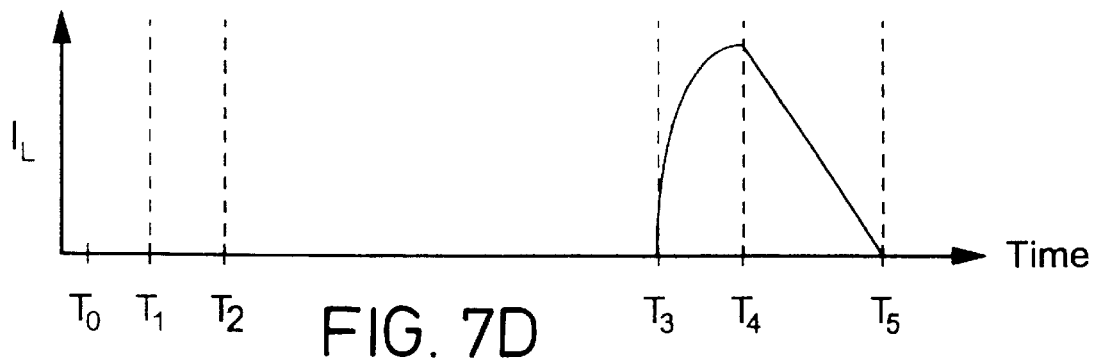
FIG. 7D is a graph of the current flowing through the inductor 52 in the circuit shown in FIG. 6 at various points in the operation of the circuit.
Figure 7E:
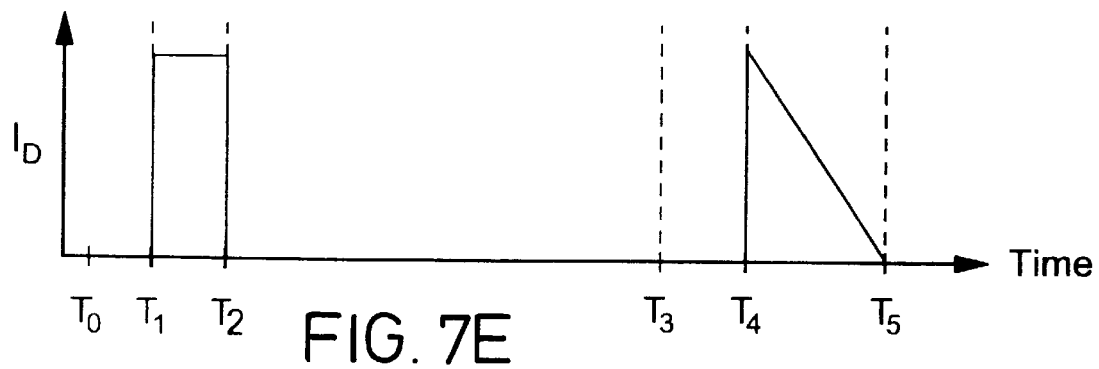
FIG. 7E is a graph of the current flow through the diode 56 at various points in the operation of the circuit.

As the negative current $I_C$ through capacitor 50 builds resonantly, the voltage at node Y will begin to rise from −365 volts towards a positive voltage. As the voltage at node Y rises, it will rapidly reach a point where the voltage at node Y reaches and exceeds zero volts. When the voltage at node Y rises to a level of approximately 20 volts (the voltage across power supply capacitor 58) diode 56 will be biased ON. In the example of FIGS. 6 and 7A–7E, this event occurs at a time $T_4$. At this point in time, a current $I_D$ will begin to flow through diode 56 into the power supply capacitor 58, charging the capacitor. This is illustrated in FIGS. 7D and 7E. The current $I_D$ will continue to flow from inductor 52 to the power supply capacitor 58 until the current drops to near zero at a time $T_5$.

Through use of the circuitry of FIG. 6 it is possible to charge the power supply capacitor 58 with current provided primarily from the resonant action of capacitor 50 with inductor 52, as opposed to current solely from the charging of capacitor 50. This is possible because approximately the same amount of charge that is introduced into capacitor 50 when switching device 10 is opened is discharged from capacitor 50 into the power supply capacitor 58 when the switching device 10 is closed. Accordingly, by proper sizing of inductor 52, it is possible to maintain an adequate charge on power supply capacitor 58 with a relatively small capacitor 50. The use of a smaller capacitor 50 reduces the amount of current that switching device 10 must handle, potentially reducing the size and cost of switching device 10 and reducing the inefficiencies introduced when the capacitor discharges through the switching device.

The precise sizing of capacitor 50 and inductor 52 will vary by application according to, inter alia, the switching frequency of the switching device and the current drain that will exist on the power supply capacitor 58. In general, however, the following guidelines apply. In embodiments where it is desirable to minimize the size of capacitor 50, inductor 52 should be sized such that most of the current required to maintain an adequate charge on the power supply capacitor is obtained by resonant action when switching device 10 is closed.

The amount of charge provided over one cycle from the inductor 52 to the power supply capacitor 58 will be approximately $I^2/2 * L/V_{58}$, where I is the peak resonant current flowing through the inductor, L is the value of inductor 52 and $V_{58}$ is the desired voltage across the power supply capacitor 58. In this example, $V_{58}$ is 20 volts, so the charge provided during each switching operation is approximately $I^2L/40$. In addition to providing adequate current to power supply capacitor 58, the inductor 52 must be sized such that the current flowing in the inductor returns to zero between switching events of the switching device. For example, if the switching frequency of the switching device is 100 kHz (a period of 10 microseconds), the inductor should be selected to deflux completely in less than 10 microseconds. In this example, a suitable deflux period for inductor 52 would be 7 microseconds. The deflux period of the inductor 52 is approximately $IL/V_{58}$. Accordingly, for a deflux period of 7 microseconds (with a $V_{58}$ of 20 volts) IL should be approximately 140 microsecond-volts.

Having selected a suitable deflux period for the inductor 52 an appropriate inductor size may be selected given the current drain on the power supply capacitor. Assuming that the average current drain on the power supply capacitor is 60 mA and that the switching period is 10 microseconds, then the current from the inductor $I^2L/40$ must be 60 mA * 10 microseconds. Assuming also a desired discharge period of 7 microseconds, it is known that IL must be approximately 140 microsecond-volts. Solving for I and L yields a peak resonant current I of 171 mA and an inductance for inductor 52 of 816 microhenrys.

Assuming a lossless resonant transfer of the energy stored in capacitor 50 to inductor 52 when switching device 10 is closed, the peak energy stored in the inductor must be equal to the energy stored in capacitor 50 at $T_3$. Mathematically $CV^2 = LI^2$ where C is the capacitance of capacitor 50, V is the peak voltage across capacitor 50, L is the inductance of inductor 52 and I is the peak resonant current through inductor 52. Because V is known (365V), L is known (816 microhenrys) and I is known (171 mA), C may be calculated at 179 pF.

Having determined the values of L and C it is now possible to determine the contributions of each towards the charging of power supply capacitor 58. As the above indicates, the inductor 52 provides current to charge the power supply capacitor 58 over a time interval of approximately 7 microseconds. Assuming that the current flowing through power switching device is 9.6 Amps when switching device 10 is opened, capacitor 50 will provide current to capacitor 58 for an interval of (365 volts * 179 picofarads)/9.6 amps or 0.0068 microseconds.

As the above indicates, in the circuit of FIG. 6, the amount of time over which current flows through capacitor 50 to the power supply capacitor, equal to $T_2-T_1$ (and in the example, approximately equal to 0.0068 microseconds) is significantly less than the amount of time current flows from inductor 52 to the power supply capacitor 58 equal to $T_5-T_4$ (and in this example, approximately equal to 7 microseconds). Although the magnitude of current flowing into the capacitor 58 between $T_1$ and $T_2$ exceeds that flowing between times $T_4$ and $T_5$, the fact that the second interval is much greater means that the significant majority of the average current that maintains the desired voltage level across power supply capacitor 58 is provided by inductor 52 allowing for the use of a small and inexpensive capacitor 50. In addition, when the low DC voltage power supply of the present invention is used, a lower power switching device 10 may be used resulting in a lower cost system, because less additional current flows through the switching device and there are fewer losses in it. This results in a more efficient system.

Figure 8:
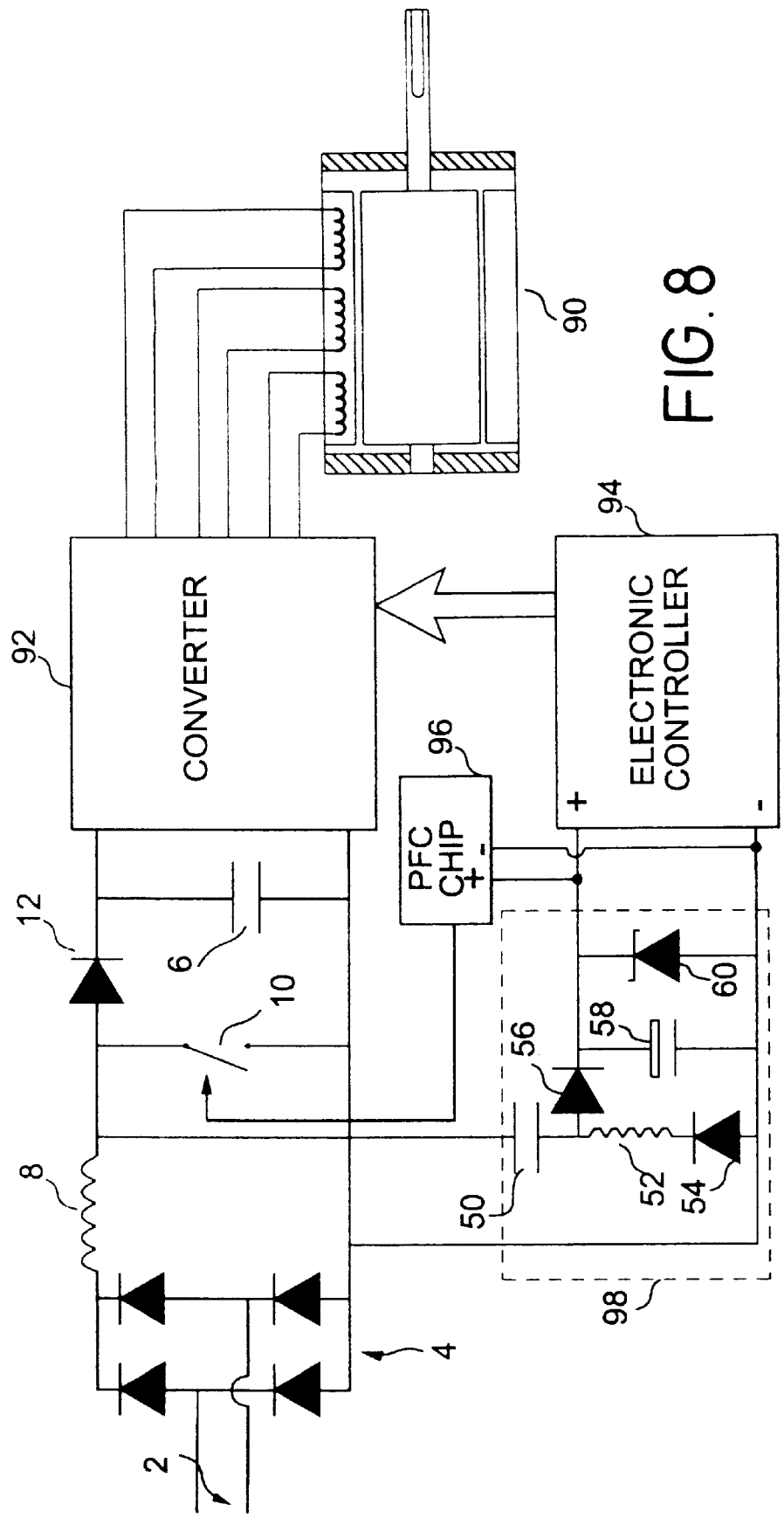
FIG. 8 is a schematic diagram of a power supply circuit according to the present invention which supplies power to a PFC chip and an electronic controller for a switched reluctance motor.

The power supply circuit of FIG. 6 is advantageous in that is provides a power supply that may be used to drive other control circuits in addition to PFC chip 14. For example, the power supply circuit of the present invention may be used in a switched reluctance motor system to power both PFC controller and an electronic controller used to control the motor. One such embodiment is illustrated in FIG. 8. FIG. 8 generally illustrates a switched reluctance motor system including a switched reluctance motor 90, a converter circuit 92 for controlling the application of power from the DC link to the motor 90 and an electronic controller 94 that controls the switching devices in the converter circuit 92. A PFC controller 96 is used to increase the power factor of the system. The electronic controller 94 may be of conventional construction as is taught in *The Characteristics, Design and Applications of Switched Reluctance Motors and Drives*, by Stephenson and Blake and presented at the PCIM '93 Conference and Exhibition at Nüfrenberg, Germany, Jun. 21–24, 1993. Electronic controller 94 is supplied with a low DC voltage from a supply 98 which is of the type illustrated in FIG. 6. As illustrated, the power supply terminals of the electronic controller 94 are coupled across the power supply capacitor 58.

The above description of several embodiments is made by way of example and not for purposes of limitation. In particular, the invention is applicable to switched reluctance machines having numbers of stator and rotor poles different from those illustrated above. The present invention is intended to be limited only by the spirit and scope of the following claims.

What is claimed is:

1. A power supply circuit comprising:

a first capacitor having a first terminal and a second terminal, the first terminal of said first capacitor receiving an input voltage;

a first rectifier having an anode and a cathode, the anode of said first rectifier being connected to the second terminal of the first capacitor;

a serially connected combination of elements having a first end and a second end, the combination comprising an inductor and a second rectifier which is connected to conduct from the second end to the first end, the first end being connected to the second terminal of the first capacitor; and a second capacitor having a first terminal and a second terminal, the first terminal of said second capacitor being connected to the cathode of the first rectifier and the second terminal of said second capacitor being connected to the second end of the said combination of elements, wherein said second capacitor supplies an output voltage on application of the input voltage, the output voltage being less than said input voltage.

2. The power supply circuit according to claim 1, further comprising a third rectifier having an anode and a cathode, the anode of said third rectifier being connected to the second terminal of said second capacitor and the cathode of said third rectifier being connected to the first terminal of said second capacitor.

3. The power supply circuit according to claim 2, wherein the first and second rectifiers are diodes.

4. The power supply circuit according to claim 3, wherein the third rectifier is a zener diode.

5. The power supply circuit according to claim 2, wherein the first and third rectifiers are diodes.

6. The power supply circuit according to claim 5, wherein the second rectifier is a zener diode.

7. The power supply circuit according to claim 1, wherein the second rectifier is a zener diode.

8. A power circuit for an electrical load comprising:
a first capacitor having a first terminal and a second terminal, the first terminal of the first capacitor receiving an input voltage;
a first rectifier having an anode and a cathode, the anode of the first rectifier being connected to the second terminal of the first capacitor;
a serially connected combination of elements having a first end and a second end, the combination comprising an inductor and a second rectifier which is connected to conduct from the second end to the first end, the first end being connected to the second terminal of the first capacitor;
a second capacitor having a first terminal and a second terminal, the first terminal of the second capacitor being connected to the cathode of the first rectifier and the second terminal of the second capacitor being connected to the second end of the combination of elements, wherein the second capacitor supplies an output voltage on application of the input voltage, the output voltage being less than the input voltage;
a dc bus arranged to derive its power from the input voltage at the first terminal of the first capacitor of the power circuit;
a convertor for controlling the transmission of power between the dc bus and the load; and
switch means operable to short circuit the input voltage and thereby regulate the input voltage to enable the power circuit.

9. The power circuit of claim 8 including a control circuit, wherein the power circuit is arranged to apply the output voltage to the control circuit.

10. The power circuit of claim 9, wherein the control circuit includes a power factor correction circuit arranged to actuate the switch means to vary the power factor of the power circuit.

11. The power circuit of claim 9 wherein the control circuit includes a controller for controlling the convertor.

12. The power circuit as claimed in claim 8 in which the electrical load includes at least one phase winding of a reluctance machine.

13. A power supply circuit for a control circuit, comprising:
a first capacitor having a first plate and a second plate, the first plate of said first capacitor receiving an input voltage;
a first rectifier having an anode and a cathode, the anode of said first rectifier being connected to the second plate of the first capacitor;
an inductor having a first terminal and a second terminal, the first terminal of said inductor being connected to the second plate of the first capacitor and the anode of the first rectifier;
a second rectifier having an anode and a cathode, the cathode of said second rectifier being connected to the second terminal of said inductor; and
a second capacitor having a first plate and a second plate, the first plate of said second capacitor being connected to the cathode of the first rectifier and the second plate of said second capacitor being connected to the anode of said second rectifier, wherein said second capacitor transmits an output voltage to the control circuit which is lower than said input voltage.

14. The power supply circuit according to claim 13, further comprising a third rectifier having an anode and a cathode, the anode of said third rectifier being connected to the second plate of said second capacitor and the anode of said second rectifier and the cathode of said third rectifier being connected to the cathode of said first rectifier and the first plate of said second capacitor.

15. The power supply circuit according to claim 14, wherein the first and second rectifiers are diodes.

16. The power supply circuit according to claim 15, wherein the third rectifier is a zener diode.

17. The power supply circuit according to claim 14, wherein the first and third rectifiers are diodes.

18. The power supply circuit according to claim 17, wherein the second rectifier is a zener diode.

19. A power supply circuit for generating a supply voltage at a first voltage level from a switched load connected to a voltage source having a second voltage, said power supply circuit comprising:
a power supply capacitor;
a charging capacitor connected to said power supply capacitor via a first diode, the charging capacitor charging said power supply capacitor when the power supply circuit is connected to the voltage source having the second voltage; and
an inductor connected to said power supply capacitor via the first diode, the inductor charging said power supply capacitor by inductive action when the power supply circuit is disconnected from the voltage source having the second voltage, so that said power supply capacitor is continuously charged.

20. The power supply circuit according to claim 19, wherein the first diode is connected between a first terminal of the charging capacitor and a first terminal of the inductor.

21. The power supply circuit according to claim 20, further comprising a second diode connected between a second terminal of the inductor and a second terminal of the power supply capacitor.

22. The power supply circuit according to claim 20, further comprising a third diode connected to the power supply capacitor for regulating the voltage across the power supply capacitor.

23. The power supply circuit according to claim 22, wherein the second diode is a zener diode.

24. The power supply circuit according to claim 22, wherein the third diode is a zener diode.

25. A switched reluctance motor system, comprising:
a motor;
a DC bus having an output voltage;

a converter circuit for controlling the application of power from the DC bus to the motor;

a switching device operable to short circuit the DC bus;

a control circuit for controlling the converter circuit and the switching device; and means for supplying power to said control circuit, said power supply means having an output voltage which is substantially lower than the output voltage of said DC bus.

26. The switched reluctance motor system according to claim 25, wherein the control circuit includes an electronic controller for controlling the converter circuit.

27. The switched reluctance motor system according to claim 26, wherein the control circuit further includes a power factor correction circuit for increasing the power factor of the system, said power factor correction circuit controlling the switching device.

28. The switched reluctance motor system according to claim 27, wherein the power supply means comprises:

a power supply capacitor;

a charging capacitor connected to said power supply capacitor via a first diode, the charging capacitor charging said power supply capacitor; and an inductor connected to said power supply capacitor via the first diode, the inductor charging said power supply capacitor by inductive action when the power supply circuit is disconnected from the DC bus, so that said power supply capacitor is continuously charged.

29. The switched reluctance motor system according to claim 28, wherein the first diode is connected between a first terminal of the charging capacitor and a first terminal of the inductor.

30. The switched reluctance motor system according to claim 29, further comprising a second diode connected between a second terminal of the inductor and a second terminal of the power supply capacitor.

31. The switched reluctance motor system according to claim 30, further comprising a third diode connected to the power supply capacitor for regulating the voltage across the power supply capacitor.

32. The switched reluctance motor system according to claim 31, wherein the second diode is a zener diode.

33. The switched reluctance motor system according to claim 31, wherein the third diode is a zener diode.

* * * * *

UNITED STATES PATENT AND TRADEMARK OFFICE
CERTIFICATE OF CORRECTION

PATENT NO. : 5,982,649
DATED : November 9, 1999
INVENTOR(S) : Michael James Turner It is certified that error appears in the above-identified patent and that said Letters Patent is hereby corrected as shown below:

Column 5, line 12, the phrase "a anode" should be -- an anode --.

Column 5, line 12, following "and", delete the word "an";

Column 8, line 35, "IL" should be -- $I_L$ --.

Column 8, line 39. "7C" should be -- 7D --.

Signed and Sealed this

Seventh Day of November, 2000

Attest:

Q. TODD DICKINSON

*Attesting Officer*  *Director of Patents and Trademarks*